United States Patent [19]  [11]  4,232,642
Yamaguchi et al.  [45]  Nov. 11, 1980

[54] IGNITION TIMING CONTROL SYSTEM FOR INTERNAL COMBUSTION ENGINES

[75] Inventors: Hiroaki Yamaguchi, Anjo; Tadashi Hattori; Minoru Nishida, both of Okazaki; Kenji Goto, Susono; Daisaku Sawada, Susono; Takashi Shigematu, Susono, all of Japan

[73] Assignees: Toyota Jidosha Kogyo Kabushiki Kaisha, Toyota; Nippon Soken, Inc., Nishio, both of Japan

[21] Appl. No.: 964,153

[22] Filed: Nov. 28, 1978

[30] Foreign Application Priority Data

Dec. 9, 1977 [JP] Japan ............................... 52-148524

[51] Int. Cl.³ .............................................. F02P 5/14
[52] U.S. Cl. .................................... 123/416; 123/422
[58] Field of Search .......... 123/117 D, 117 R, 32 EH

[56] References Cited
U.S. PATENT DOCUMENTS

| | | | |
|---|---|---|---|
| 3,593,692 | 7/1971 | Scholl et al. | 123/32 EH |
| 3,623,459 | 11/1971 | Gordon et al. | 123/32 EH |
| 3,906,207 | 9/1975 | Rivere et al. | 123/117 D |
| 3,935,845 | 2/1976 | Aono et al. | 123/117 R |
| 4,022,170 | 5/1977 | Crall et al. | 123/117 R |
| 4,052,967 | 10/1977 | Colling et al. | 123/117 D |
| 4,075,982 | 2/1978 | Asano et al. | 123/32 EH |
| 4,104,998 | 8/1978 | Fenn | 123/117 D |

Primary Examiner—Charles J. Myhre
Assistant Examiner—Andrew M. Dolinar
Attorney, Agent, or Firm—Cushman, Darby & Cushman

[57] ABSTRACT

An ignition timing control system is provided with an ignition timing computing unit which determines a maximum acceleration ignition advance $\alpha$ ACMAX in accordance with an intake pressure difference P and a water temperature T of the engine. When an acceleration is detected by a rapid movement of an acceleration pedal, the maximum acceleration ignition advance is added to the normal ignition advance. Thereafter, the maximum acceleration ignition advance is gradually reduced to zero in accordance with the lapse of time or a change in the engine speed.

5 Claims, 8 Drawing Figures

IGNITION TIMING CONTROL SYSTEM FOR INTERNAL COMBUSTION ENGINES

BACKGROUND OF THE INVENTION

The present invention relates to ignition systems for internal combustion engines, and more particularly the invention relates to an ignition timing control system having an acceleration ignition advance function which ensures the best performance of the engine during the periods of acceleration.

The ignition timing of an internal combustion engine must be determined in accordance with the operating conditions of the engine to ensure the optimum operation of the engine. The ignition timing control systems known in the art are of two general types, mechanical and electrical systems. With either of these two types, it has been the usual practice to utilize the engine speed and intake vacuum as two basic factors for determining the ignition timing and control the ignition timing in response to these two conditions. Thus, with either of the types, two preliminarily programmed ignition timing characteristics, i.e., characteristic $\alpha N$ using only the engine speed N as a variable and another characteristic $\alpha P$ using only the intake vacuum P as a variable are employed so that in the actual operation of the engine the ignition timing is determined in accordance with the sum $\alpha N + \alpha P$ of the values respectively corresponding to the engine speed N and intake vacuum P, and no provisions are made to provide the required acceleration compensation during the periods of acceleration operation where the engine throttle valve linked to the accelerator pedal is opened rapidly.

However, during the periods of acceleration, particularly during acceleration operation of the engine from the cold, when the accelerator pedal is moved rapidly, even if the air-fuel ratio of mixture is adjusted by the carburetor or the like, the resulting atomization of the fuel generally tends to become unsatisfactory, thus causing the fuel to stick to the walls of the intake pipe or increasing the diameter of the fuel droplets and thereby causing the production of nonuniform mixture. With the cold engine, the temperature of the intake pipe walls is particularly low with the resulting decrease in the amount of carburetion and this has a great detrimental effect. If such a nonuniform mixture is drawn into the combustion chamber, the mixture will not be burned completely and hence a sufficient torque will not be produced, thus producing only a gradually increasing torque.

SUMMARY OF THE INVENTION

With a view to overcoming the foregoing deficiencies in the prior art, it is the object of the invention to provide an ignition timing control system for internal combustion engines wherein the ignition timing is controlled to suit the air-fuel ratio of the mixture after the rapid movement of the accelerator pedal.

In the present invention when an engine acceleration is detected by a rapid movement of an accelerator pedal, an acceleration ignition advance is provided so that an acceleration ignition advance; $\alpha$ ACMAX determined according to the engine conditions, that is, a variable indicative of the engine acceleration condition, i.e., intake pressure difference P in this invention and temperature W is added to the normal ignition advance and the acceleration ignition advance is then decreased by a predetermined value with the lapse of time T or a change in the engine speed until the acceleration ignition advance is adjusted to zero, thus controlling the ignition timing to best suit the air-fuel ratio of mixture during the rapid opening of the throttle valve, ensuring satisfactory burning of the mixture, greatly reducing unburned emissions, ensuring a rapid increase in the torque immediately after the rapid opening of the throttle valve and greatly improving the engine performance.

DESCRIPTION OF THE PREFERRED EMBODIMENTS

Figure 1:
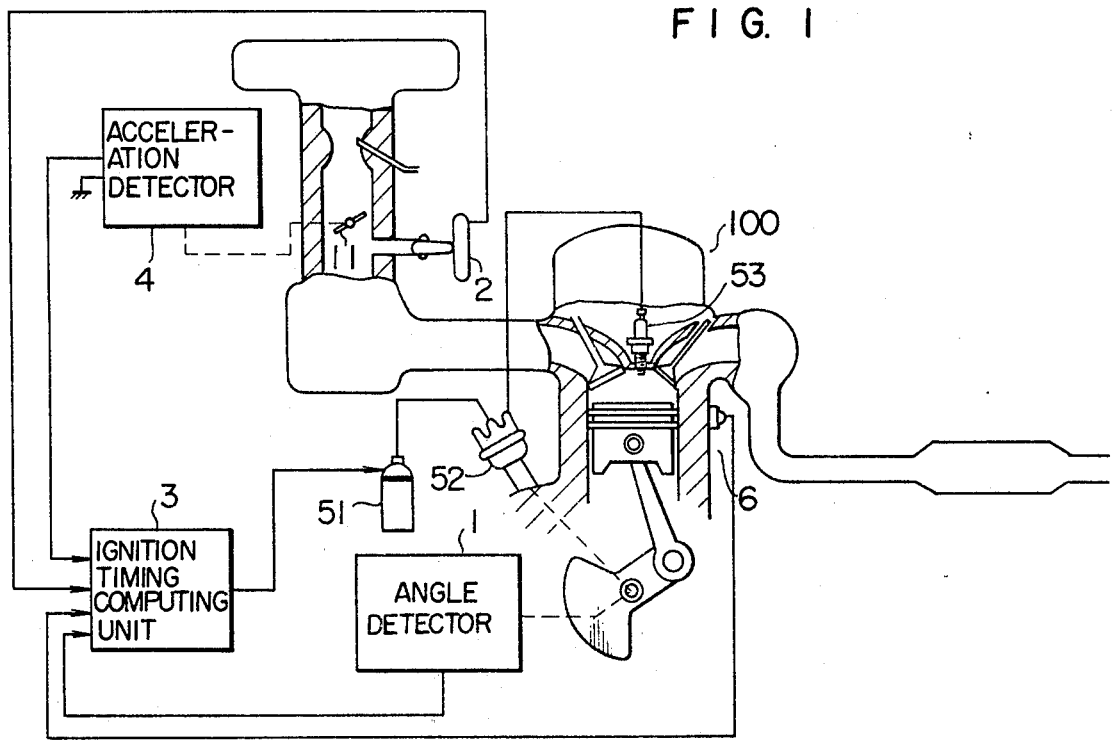
FIG. 1 is a schematic block diagram of an embodiment of an ignition timing control system according to the present invention showing the principal part thereof in section.

The present invention will now be described in greater detail with reference to the illustrated embodiments. Referring first to FIG. 1, there is illustrated a block diagram of an engine incorporating an ignition timing control system according to the present invention. In the Figure, numeral 100 designates a four cylinder, four stroke internal combustion engine, 11 a throttle valve linked to the automobile accelerator pedal which is not shown, 1 an angle detector for detecting a reference angle and rotational angle of the engine shaft, 2 an intake pressure detector for detecting the intake negative pressure on the manifold side (downstream of the throttle valve 11), and 4 an acceleration detector for detecting the opening speed of the throttle valve 11 to generate a "0" level output in response to an acceleration greater than a predetermined value. Numeral 3 designates an ignition timing computing unit, 51 an ignition coil, 52 a distributor for distributing the ignition spark from the ignition coil 51 to the respective cylinders, and 53 a spark plug.

Figure 2:
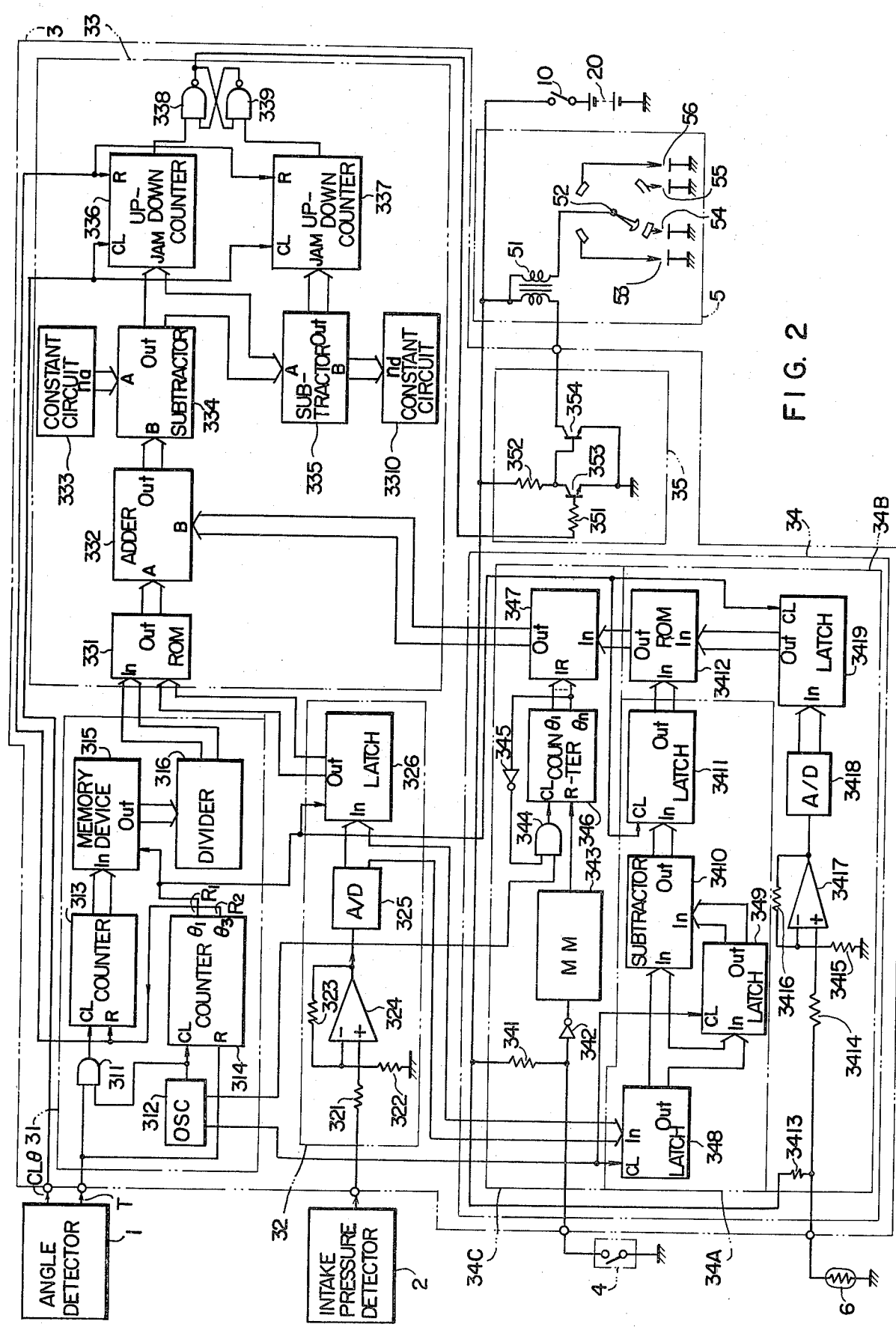
FIG. 2 is a circuit diagram for the embodiment shown in FIG. 1.

FIG. 2 illustrates a detailed circuit diagram for the system of this invention. In the Figure, a first detection circuit 31 comprises an AND circuit 311 for receiving a reference signal T from the angle detector 1 which is indicative of the top dead center position of each cylinder and having a time width corresponding to predetermined crank angle degrees, an oscillator circuit 312 of a known type which generates high frequency pulses, a binary counter 313, a decade counter 314 which receives the reference signal T as a reset input and the output of the oscillator circuit 312 as a clock input and having a decoding output adapted to successively generate clock pulses in response to the negative-going transition of the signal T, a memory device 315 (hereinafter referred to as a latch) and a divider 316, whereby the clock pulses applied during the time that the reference signal T is at "1" level or over a predetermined crank angle are counted by the binary counter 313 whose count is stored in the latch 315 for every half revolution of the engine, and a constant is divided by this stored value in the divider 316, thus detecting the engine speed N.

A second detecting circuit 32 comprises an amplifier circuit adapted to receive the analog output of the intake pressure detector 2 and including resistors 321, 322 and 323 and an operational amplifier 324, an A/D converter 325 for converting the amplified output from its analog value to a digital value and a latch 326 for receiving and storing the output of the A/D converter 325 for every half revolution of the engine, thus detecting the intake negative pressure. The outputs of the first and second detection circuits 31 and 32 or the detected engine speed N and the intake negative pressure P are applied to an ignition timing computing circuit 33.

An ignition advance setting means 34 comprises an acceleration condition detecting circuit 34A, an acceleration advance maximum value computing circuit 34B and an adjusting circuit 34c. Its internal circuitry comprises resistors 341, 3413, 3414, 3415 and 3416, NOT circuits 342 and 345, an AND circuit 344, a monostable multivibrator 343 responsive to the positive-going transition of its input pulse to generate a signal having a predetermined pulse width, a counter 346 for determining the required decrement from the maximum value $\alpha ACMAX$ of the acceleration ignition spark, a subtraction device 347, latches 348 and 349 for detecting intake negative pressure at predetermined intervals, a subtractor 3410 for producing intake pressure difference P, a latch 3411 for storing the intake pressure difference, an operational amplifier 3417 for amplifying the signal generated from the temperature detector 6, an A/D converter 3418, a latch 3419, and a read only memory 3412 (hereinafter referred to as an ROM) having programmed thereinto the maximum value $\alpha ACMAX = f(P, W)$ of the acceleration ignition advance and adapted to receive the intake pressure difference P and the water temperature W, whereby an acceleration ignition advance $\alpha AC$ corresponding to an acceleration determined in accordance with the intake pressure P, the water temperature W and the time T, is applied to the ignition timing computing circuit 33 as the engine speed N and the intake pressure P.

The ignition timing computing circuit 33 comprises an ROM 331 for generating an ignition timing output $n\alpha$ corresponding to the outputs of the divider 316 and the latch 326, an adder for producing the sum of the output $n\alpha$ of the ROM 331 and the output $\alpha AC$ of the adder 347, constant circuits 333 and 3310 (e.g., switches which set binary codes) for respectively setting constants na and nd, a known type of subtractor 334 which subtracts the output $(n\alpha + \alpha AC)$ of the adder 332 from the output na of the constant circuit 333, a known type of subtractor 335 for subtracting the output nd of the constant circuit 3310 from the output $(na - n\alpha - \alpha AC)$ of the subtractor 334, an up-down counter 336 (e.g., the RCA CD4029) for receiving the output $(na - n\alpha - \alpha AC)$ of the subtractor 334 as its JAM input, the angle pulses $CL\theta$ as its clock input and the output $R_2$ of the decade counter 314 as its reset input to count down as many pulses as the value $(na - n\alpha - \alpha AC)$, an up-down counter 337 for similarly counting down the number of the output $(na - n\alpha - \alpha AC - nd)$ of the subtractor 335, and a flip-flop circuit consisting of NAND circuits 338 and 339 and adapted to receive the output of the up-down counters 336 and 337, respectively.

A primary coil control circuit 35 comprises resistors 351 and 352 and transistors 353 and 354, and it is responsive to the output of the ignition timing computing circuit 33 to switch on and off the flow of current in the primary winding of the ignition coil.

An ignition circuit 5 comprises the ignition coil 51, the distributor 52 and the spark plugs 53, 54, 55 and 56, whereby when the primary current of the ignition coil 51 is switched on and then off, a spark is produced at each of the spark plugs 53 to 56. Numeral 10 designates a key switch, and 20 a battery.

Figure 3:
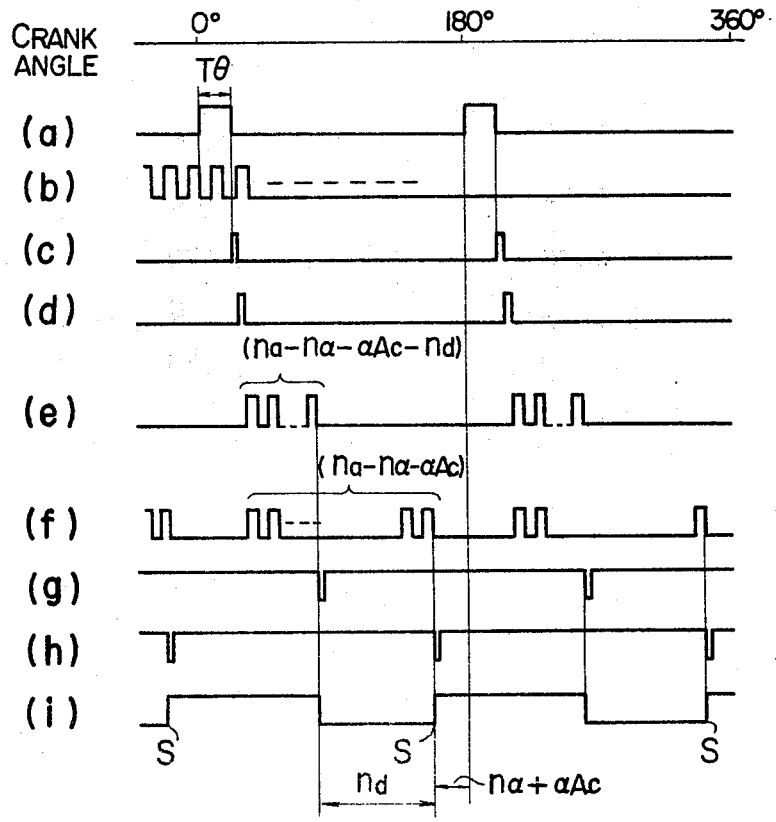
FIGS. 3 and 4 are time charts useful for explaining the operation of the embodiment shown in FIG. 1.
Figure 4:
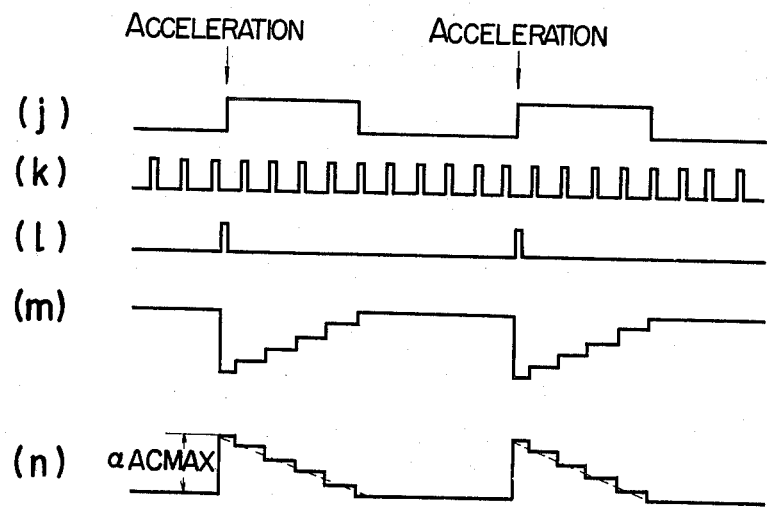

Next, the operation of the above-described embodiment will be described with reference to the time charts of FIGS. 3 and 4. As shown in (a) and (b) of FIG. 3, the angle detector 1 generates for every revolution of the crankshaft two reference signals T each having a width corresponding to a predetermined crankshaft rotational angle from the top dead center of each cylinder as well as angle signals $CL\theta$ each generated for every 1° crankshaft revolution. In the ignition timing computing unit 3, as shown in (c) and (d) of FIG. 3, in response to the clock pulses from the oscillator circuit 312 the decade counter 314 generates signals $R_1$ and $R_2$ respectively in response to the first and third clock pulses following the negative-going transition of the reference signal T. In this case, the time interval between the negative transition of the reference signal T and the negative transition of the signal $R_2$ is selected sufficiently smaller than a crank angle of 1° throughout the range of the engine speeds. The AND circuit 311 performs the AND operation on the clock pulses and the reference pulse T so that the binary counter 313 counts the clock pulses applied over the predetermined angle $T\theta$ and the resulting count is stored in the latch 315 in response to the negative transition of the reset signal $R_1$. Consequently, the number of pulses stored in the latch 315 increases as the engine speed decreases. The divider 316 divides a constant by the stored value of the latch 315, thus detecting the engine speed N.

In the second detection circuit 32 the intake negative pressure is similarly stored in the latch 326 in response to the negative transition of the reset signal $R_1$. In this case, since the intake pressure detector 2 detects the intake negative pressure on the manifold side (downstream of the throttle valve 11), the detected negative pressure is proportional to the opening of the throttle valve 11 (the detected negative pressure decreases with increase in the opening of the throttle valve 11) and the detected negative pressure is stored in the latch 326.

In the acceleration ignition advance setting means 34 the acceleration detector 4 generates a "0" level signal only when there is an acceleration (a throttle valve opening speed) greater than a predetermined value, and a "1" level output is generated when there is an acceleration smaller than the predetermined value or there is a deceleration. When an acceleration greater than the predetermined value is detected, the signal inverted in phase and shown in (j) of FIG. 4 is applied to the monostable multivibrator 343 which in turn generates at its output the reset signal for the counter 346 which is shown in (l) of FIG. 4, and the counter 346 is reset. The clock signals shown in (k) of FIG. 4 are applied from the oscillator circuit 312 to the counter 346 so that after the resetting the counter 346 counts up gradually and the counting operation is stopped in response to the production of a "1" level at its θn terminal corresponding to ½ of the full count. The resulting count value represents a value for gradually decreasing the acceleration advance maximum value αACMAX. On the other hand, a change in the thermistor resistance of the temperature detector 6 is detected as a voltage change by its series connection with the resistor 3413, amplified by the operational amplifier 3417 and converted to a digital quantity by the A/D converter 3418, and the resulting temperature signal is stored in the latch 3419 in response to the signal $R_1$ from the counter 314. On the other hand, the intake pressure signal is generated from the A/D converter 325 and the intake pressure is stored in the latches 348 and 349 which are responsive to the clocks generated from the oscillator circuit 312 at the predetermined intervals, that is, an intake pressure $Pt_1$ at a time $t_1$ is stored in the latch 348 and hence an intake pressure $Pt_2$ delayed by a predetermined time interval is stored in the latch 349. In other words, the latches 348 and 349 each constitutes a shift register. The subtractor 3410 produces the intake pressure difference $Pt_1 - Pt_2 = P$ indicative of the engine acceleration condition, and the intake pressure difference $Pt_1 - Pt_2$ is stored in the latch 3411 in response to the signal $R_1$. In response to the intake pressure difference $Pt_1 - Pt_2$ stored in the latch 3411 and the temperature signal stored in the latch 3419, the acceleration advance maximum value αACMAX shown in (n) of FIG. 4 and programmed in the ROM 3412 is read out. The subtraction device 347 subtracts from the value αACMAX the count value of the counter 346 which increases with time as shown in (m) of FIG. 4 and the resulting acceleration advance angle α AC is applied to the adder 332. In this case, the subtractor device 347 is designed so that when the count number of the counter 346 becomes greater than or equal to α ACMAX there results α AC=0, and thereafter this α AC=0 is generated from the subtractor device 347 irrespective of the output of the counter 346, thus providing the acceleration ignition advance shown in (n) of FIG. 4.

Figure 5:
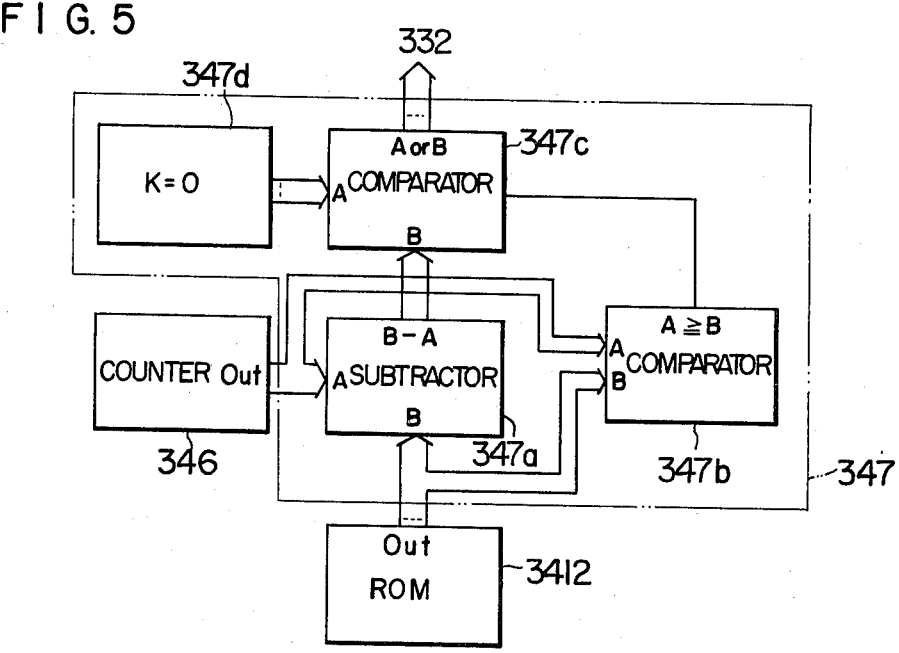
FIG. 5 is a circuit diagram showing an embodiment of the subtractor device shown in the circuitry of FIG. 2.

FIG. 5 illustrates an example of the construction of the subtractor device 347. In the Figure, numeral 347a designates a subtractor, 347b a comparator, 347c a selector circuit, and 347d a setting device having a preset value of 0. The subtractor 347a subtracts the output count value of the counter 346 from the acceleration advance maximum value α ACMAX from the ROM 3412 and at the same time the comparator 347b compares the acceleration advance maximum value α ACMAX applied to its B input and the output count value of the counter 346 applied to its A input as to their relative magnitude. When the comparator 347b determines that A<B, the selector circuit 347c selects the output of the subtractor 347a which decreases with the lapse of time and it is generated as the output of the subtractor device 347. On the other hand, when the count number of the counter 346 becomes greater than or equal to α ACMAX so that the comparator 347b determines A≧B, the selector circuit 347c selects the preset value 0 of the setting device 347d and it is generated as the output of the subtractor unit 347.

The outputs of the first and second detection circuits 31 and 32 are applied to the ROM 331 in the ignition timing computing circuit 33 and the ROM 331 generates a preset value nα in accordance with the engine speed and the intake pressure. Consequently, the outputs of the adder 332 and the subtractors 334 and 335 respectively become (nα+αAC), (na−nα−αAC) and (na−nα−αAC−nd), so that in response to the negative transition of the signal $R_2$ the up-down counter 336 counts as many angle signals CLθ as (na−nα−αAC) as shown in (f) of FIG. 3 and generates a pulse which goes to "0" upon completion of the counting as shown in (h) of FIG. 3, and in response to the negative transition of the signal $R_2$ the up-down counter 337 counts angle pulses CLθ as many as (na−nα−αAC−nd) as shown in (e) of FIG. 3 and generates a pulse which goes to "0" upon completion of the counting as shown in (g) of FIG. 3. As shown in (i) of FIG. 3, the flip-flop circuit comprising the NAND circuits 338 and 339 generates a pulse which goes to "0" level in response to the signal (g) and goes to "1" level in response to the signal (h). When the signal (i) goes to "0" level, the transistor 353 is turned off and the transistor 354 is turned on to supply current to the primary winding of the ignition coil 51 and the current flow is interrupted in response to the positive-going transistor of the signal (i), thus inducing a high voltage in the secondary winding and thereby causing a spark at the spark plugs 53, 54, 55 and 56 of the respective cylinders through the distributor 52.

The previously mentioned acceleration advance maximum value α ACMAX is determined by the following equation obtained by experiments.

$$\alpha ACMAX = K(K_1 - W) \times (Pt_1 - Pt_2)$$

where K and $K_1$ are constants, W is the water temperature and $Pt_1 - Pt_2$ is the intake pressure difference.

Figure 6:
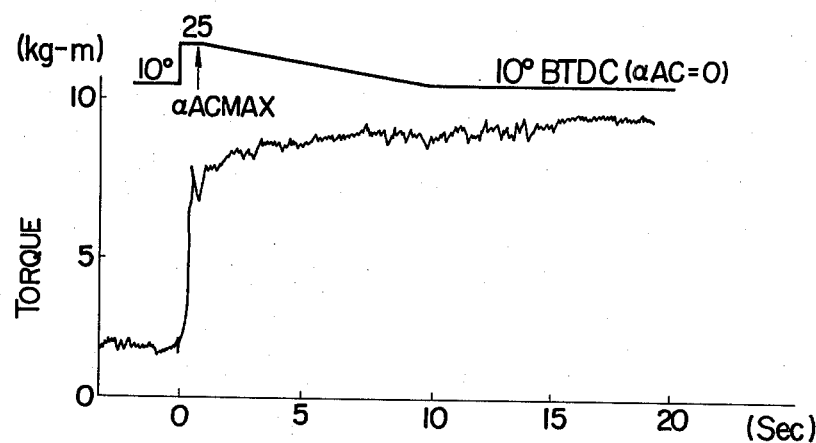
FIG. 6 is a characteristic diagram showing the effect of an acceleration ignition advance.

As a result, when an acceleration signal is generated, the optimum ignition advance α ACMAX determined by the acceleration condition indicated by the intake pressure difference and the water temperature is selected as an acceleration ignition advance and thereafter it is decreased with time until an ignition advance characteristic with α AC=0 is obtained such as the one shown in FIG. 6. A high torque is produced simultaneously with the provision of the acceleration ignition advance.

In this case, since the angle signals CLθ are each generated for every 1° crank angle, the count number of the signals itself represents crank angle degrees. In other words, the signals respectively shown in (g) and (h) of FIG. 3 respectively go to "0" level after (na−nα−αAC−nd)° and (na−nα−αAC)° from the negative going transition of the signal $R_2$. Since the time interval between the negative-going transition of the reference signal T and that of the signal $R_2$ is less than 1°, if the preset value na is selected (180−Tθ), the advance angle α becomes α=(nα+αAC)° and the current-flow angle becomes nd. In other words, an acceleration ignition advance is provided which initially is an ignition advance αAC corresponding to the acceleration condition detected in terms of the intake pressure difference and the water temperature, and it is then adjusted with time until there results α AC=0.

While, in the embodiment described above, the ignition advance α AC is adjusted with time, the adjustment may be effected according to the engine speed. More specifically, by applying for example the reference signal T to the AND circuit 344 in FIG. 2 it is possible to decrease the value of α AC by a predetermined value for every ½ engine revolution, thus reducing the required adjusting time with increase in the engine speed and making it possible to provide the required measure to meet increase in the rate of gas flow and fuel flow.

Further, while, in the embodiment described above, the operations of the adder 332 and the subtractors 334 and 335 are effected during the time interval between the reset signals R₁ and R₂, where a longer time is required for the operations, it is only necessary to reset the up-down counters 336 and 337 at a point delayed by a predetermined angle $\theta'$ from the negative-going transition of the reference signal T, and in this case the preset value na may be selected $na=180-T\theta-\theta'$.

Figure 7:
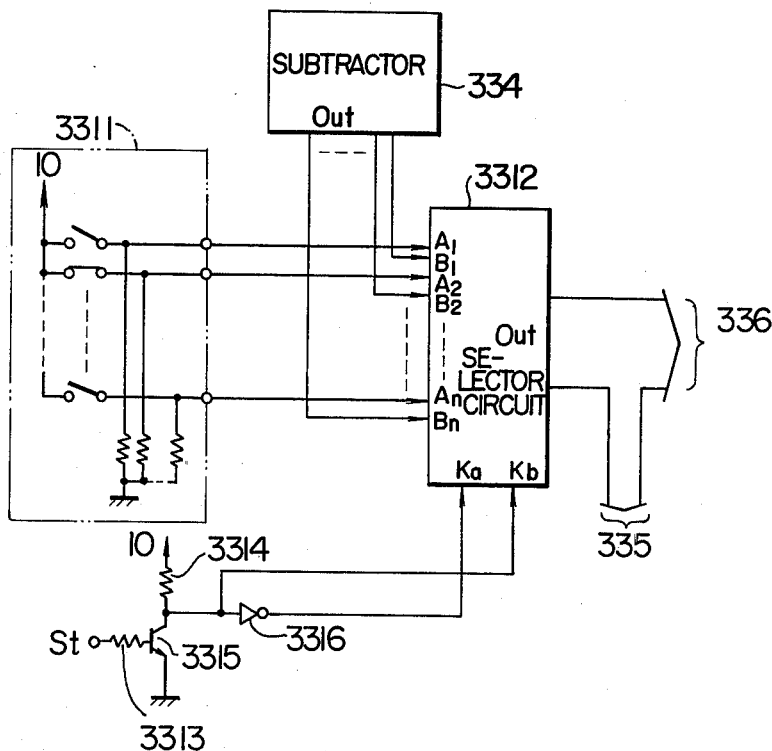
FIG. 7 is a circuit diagram showing the principal part of another embodiment of the system according to the invention.

Further, it is possible to effect the ignition with a predetermined fixed ignition advance (hereinafter referred to as $\alpha S$) during the starting period of an engine. In other words, in FIG. 7 the required $\alpha S$ is preset by a setting circuit 3311 comprising switches and resistors to preset a binary code and the preset $\alpha S$ is applied to A inputs of a selector circuit 3312 (e.g., the RCA CD 4019) whose B inputs receive the output of the subtractor 334. The output of a start signal reshaping circuit comprising resistors 3313 and 3314 and a transistor 3315 (i.e., the collector output of the transistor 3315) is applied to a control input Kb of the selector circuit 3312, and the output of the start signal reshaping circuit is inverted by a NOT circuit 3316 and then applied to a control input Ka of the selector circuit 3312. When the engine is started, the start signal applied from the starter to an input terminal St is inverted to "0" level by the transistor 3315 so that the terminal Kb goes to "0" level and the terminal Ka goes to "1" level, thus causing the selector circuit 3312 to generate as its output the input A or the ignition advance $\alpha S$ and thereby effecting the ignition at the fixed ignition advance. After the engine has started, the start signal is no longer applied from the starter so that the terminal Kb goes to "1" level and the terminal Ka goes to "0" level, thus causing the selector circuit 3312 to generate as its output the input B. In other words, the ignition is effected by the output of the subtractor 334.

Figure 8:
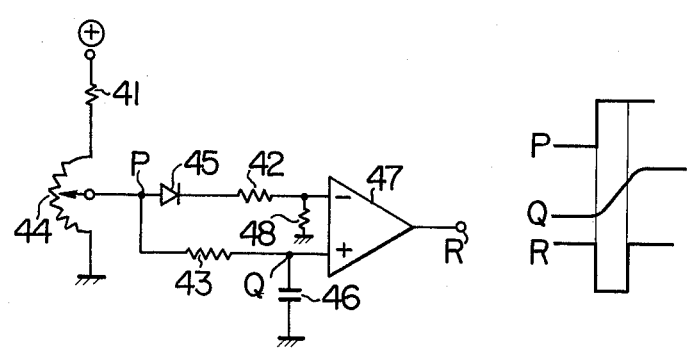
FIG. 8 is a circuit diagram showing an embodiment of the acceleration detector used with the system shown in FIG. 1.

On the other hand, the acceleration detector 4 may be designed so that a change in a displacement detecting generator or variable resistor operatively associated with the throttle valve is detected, or alternatively a pulse generator may be connected to the throttle valve to detect an acceleration by counting the number of pulses generated in a unit time. FIG. 8 shows an embodiment of the acceleration detector 4 comprising a variable resistor operatively associated with the throttle valve. In the Figure, numerals 41, 42, 43 and 48 designate resistors, 44 a variable resistor operatively associated with the throttle valve 11 to increase its resistance value in response to the opening of the throttle valve 11, 45 a diode, 46 a capacitor, and 47 a comparator. When the throttle valve 11 is opened rapidly, the input to the inverting input of the comparator 47 increases in response to the rapid opening of the throttle valve 11 and the input to its noninverting input increases slowly due to the capacitor 46, and in this way the comparator 47 generates a "0" level output when the throttle valve 11 is opened rapidly. On the other hand, where the acceleration detector 4 is so designed that an output is generated in response to the opening speed of the throttle valve 11, instead of detecting the acceleration condition of the engine by a change in the intake negative pressure, the acceleration condition of the engine may be detected in accordance with either the opening speed or the change in position in predetermined time period of the throttle valve 11.

We claim:

1. An ignition timing control system for an internal combustion engine comprising:
   first detecting means, responsive to an intake condition of said engine, for producing a first detection output indicative of the detected intake condition;
   second detecting means, responsive to the rotation of said engine, for producing a second detection output indicative of the detected rotational speed;
   third detecting means for producing a third detection output indicative of a rate of change in an operator induced demand for acceleration of said engine in excess of a predetermined rate of change in demand;
   fourth detecting means, responsive to the temperature of said engine, for producing a fourth detection output indicative of the detected temperature;
   fifth detecting means, responsive to an operating condition of said engine for producing a fifth detection output related to the acceleration of said engine between a first selected instant in time and a second selected instant in time;
   first setting means, responsive to said first and second detection outputs, for producing a first setting output indicative of the first ignition advance corresponding to the detected intake condition and rotational speed;
   second setting means for producing a second setting output in response to said third detection output, said second output being indicative of the second ignition advance which gradually changes from a reference value determined in dependence on said fourth and fifth detection outputs;
   correcting means responsive to said first and second setting outputs, for correcting said first setting output in accordance with said second setting output and producing an output indicative of the corrected ignition advance, said output being equal to said first setting output when said second setting output is absent; and
   igniting means responsive to said output of said correcting means and effective to produce an ignition spark at said corrected ignition advance.

2. An ignition timing control system according to claim 1, wherein said second setting means includes:
   pulse generating means effective to produce a train of pulses at a fixed frequency;
   counting means effective to count said pulses of said pulse generating means in response to said third detection output;
   memory means effective to memorize said reference value relative to said fourth and fifth detection outputs; and
   totalizing means effective to totalize said reference value of said memory means and counted value of said counting means for producing said second setting output.

3. An ignition timing control system according to claim 1, wherein said second setting means includes:
   pulse generating means effective to produce a train of pulses at a frequency proportional to the rotation speed of said engine;
   counting means effective to count said pulses of said pulse generating means in response to said third detection output;
   memory means effective to memorize said reference value relative to said fourth and fifth detection outputs; and totalizing means effective to totalize said reference value of said memory means and counted value of said counting means for producing said second setting output.

4. An ignition timing control system according to claim 2 or 3, wherein said fifth detecting means is adapted to receive said first detection output indicative of the detected intake condition and detect the change in the detected intake condition as the acceleration.

5. An ignition timing control system according to claim 2 or 3, wherein said third detecting means is adapted to detect the moving speed of the throttle valve of said engine, and wherein said fifth detecting means is adapted to detect change in the position of said throttle valve as the acceleration.

* * * * *